INVENTOR.
JOHN M. RHOADES
BY Michael Masnik
HIS ATTORNEY

United States Patent Office 3,559,179
Patented Jan. 26, 1971

3,559,179
PATTERN CONTROLS FOR AUTOMATIC MACHINES
John M. Rhoades, Waynesboro, Va., assignor to General Electric Company, a corporation of New York
Filed Aug. 29, 1967, Ser. No. 664,025
Int. Cl. G05b 15/00, 19/24
U.S. Cl. 340—172.5                              25 Claims

ABSTRACT OF THE DISCLOSURE

An arrangement for operating on an object with an automatic machine under control of command data recorded on a record medium such as endless tape wherein the data includes data representing a plurality of offset positions and a single repeat pattern of control to be repeatedly executed N times, at least once at each of said offset positions. A reader repeatedly reads said data from the tape and a counter continuously counts the number of times the repeat pattern has been read to provide a repeat pattern count number and logic circuitry responsive to the count number equalling a count other than N for executing the repeat pattern at the offset position corresponding to the count number.

BACKGROUND OF THE INVENTION

Field of invention

This invention relates to a new and improved control system for controlling the operations of a machine moving member on an object.

More particularly, the invention relates to a novel repeat pattern control subsystem for use with an automatic machine control, and to the method of operation of such repeat pattern control subsystem.

Brief description of prior art

There are many known manufacturing procedures employing automatically, or semiautomatically controlled machine tools where it is necessary to carry out a number of similar or identical machining operations at different spaced-apart positions or locations on an object being worked on (hereinafter referred to as a work member). These machining operations may involve drilling, tapping, boring, punching, turning, cutting, or any other similar operation which automatically controlled machine tools are capable of performing. This number of repeated similar machining operations forms a pattern of operations, and the pattern of operations thereafter is repeated at a number of different, offset locations relative to a base reference position on the work member.

In the past, this problem has been solved through the use of two record readers such as punched tape readers. In this known arrangement a first tape reader uses a continuous, closed loop of tape which contains positioning information for all of the machining operations to be conducted to complete one pattern as well as for adjusting, advancing, retracting, etc., the working head of the machine tool. One complete circulation of this endless loop of tape through the reader results in the machining of all the places required to complete one pattern on the work member. The second tape reader uses a second tape which contains positioning information for all positions on the surface of the work member where the pattern is to be repeated. Through alternate operations of the two readers, the first reader completes one circulation of the tape loop for each new offset position provided by the second reader. A series of repeated patterns which are offset in position from a base or reference position, is thus produced at desired locations on the work member. While this known technique works satisfactorily, it does require the use of two tape readers which are costly and further requires the programming of two separate tapes of instructions.

Another known technique which requires the use of only one tape reader is to reprogram the basic pattern data along with the positional information for each of the N repeated offset positions. This technique requires an exorbitant amount of tape and programming effort; however, making it quite costly and time-consuming.

SUMMARY OF THE INVENTION

The present invention overcomes the disadvantages of the known techniques described above by carrying out all of the operations performed with the two tape reader technique, but does so with only a single tape reader requiring only a single tape of instructions.

It is therefore a primary object of the present invention to provide a repeat pattern control system or subsystem and method of operation which will repeat a pattern of machining operations at different offset locations on a work member. This is achieved by performing the pattern dimension and machining instructions on a single record member, such as punched or magnetic tape in the form of a loop, or an open length or sheet of recording material with provisions for rewind or scan, which is repetitively read by a single record reader (such as a punched tape reader), and the pattern offset position data for each of the N offset positions along with suitable keys identifying the instructions for each Nth offset position and the beginning and end of the pattern instructions.

In practicing the invention, an automatic machine tool control system is provided which normally includes means for reading a set of preformed instructions recorded on a suitable recording medium such as punched tape. The control system also normally further includes decode and control circuit means coupled to and controlled by the reading means for converting the instructions being read out to electrical signals representative of the instructions and thereafter controlling the machine tool in accordance with the instruction. Positioning means also normally are provided which are controlled by the decode and control means form moving the machine tool relative to a work member to be operated on by the machine tool into desired spatial relationship with respect to the working head of the machine tool. According to the invention, a repeat pattern control subsystem is provided for use with the above elements which includes first logic circuit means for sequentially selecting out from the output from the decode and control circuit means the offset data relating to the X-axis and Y-axis position and desired charcateristics of each one of the N repeat patterns. Command circuit means are controlled by the first logic circuit means for sequentially reading into the positioning means the X-axis and Y-axis offset data for each of the N repeat patterns. The positioning means is thereafter operative following the reading in of the offset data relating to each Nth pattern to appropriately locate the work member relative to and adjust the working head of the machine tool. Command circuit means are coupled to the output of the decode and control circuit means for sequentially reading into and controlling the machine tool in accordance with the repeat pattern after each such setting, and second logic circuit means are provided which are coupled to the output of the decode and control circuit means for identifying the completion of the desired number of repeat patterns and thereafter inactivating the system from further repetitions of the repeat patterns. While the record reader preferably is a punched tape record reader, other types of endless record readers such as a magnetic drum could be employed. Additionally, if desired three dimensional control over movements of the machine tool can be provided by adding a third Z-axis control similar to those employed for the X-axis and Y-axis.

By means of the above described apparatus, a novel method of operating an automatic machine tool is provided wherein the work member is machined at a standard reference location in accordance with the basic pattern of operations by controlling the machine tool in accordance with the basic pattern data being read out by the single record reader. The system then reads out and controls the machine tool to position it relative to the work member at the location of the first offset position for the pattern of operations to be repeated. Thereafter, the machine tool is inhibited from responding to further offset position data recorded on the recording medium while the recorded medium is repeatedly read through the record reader to the start of the repetitive pattern data. The repetitive pattern data is then read out and controls the machine tool to machine the work member at the first offset location in accordance with the repetitive basic pattern of operations data. Thereafter the machine tool is again inhibited from responding to previously executed offset positions data recorded on the record member while scanning the record through the record reader to the start of the next unexecuted offset position data. Thereafter, this cycle of operations is repeated by repeatedly passing the tape through the reader for the desired number of repeated machining operations to be conducted on the work member, and upon completion of the desired number of repetitive machining operations, further reading out of the recording medium is discontinued to thereby terminate further repetitions of the basic pattern.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

DETAILED DESCRIPTION OF PREFERRED EMBODIMENT

Figure 1:
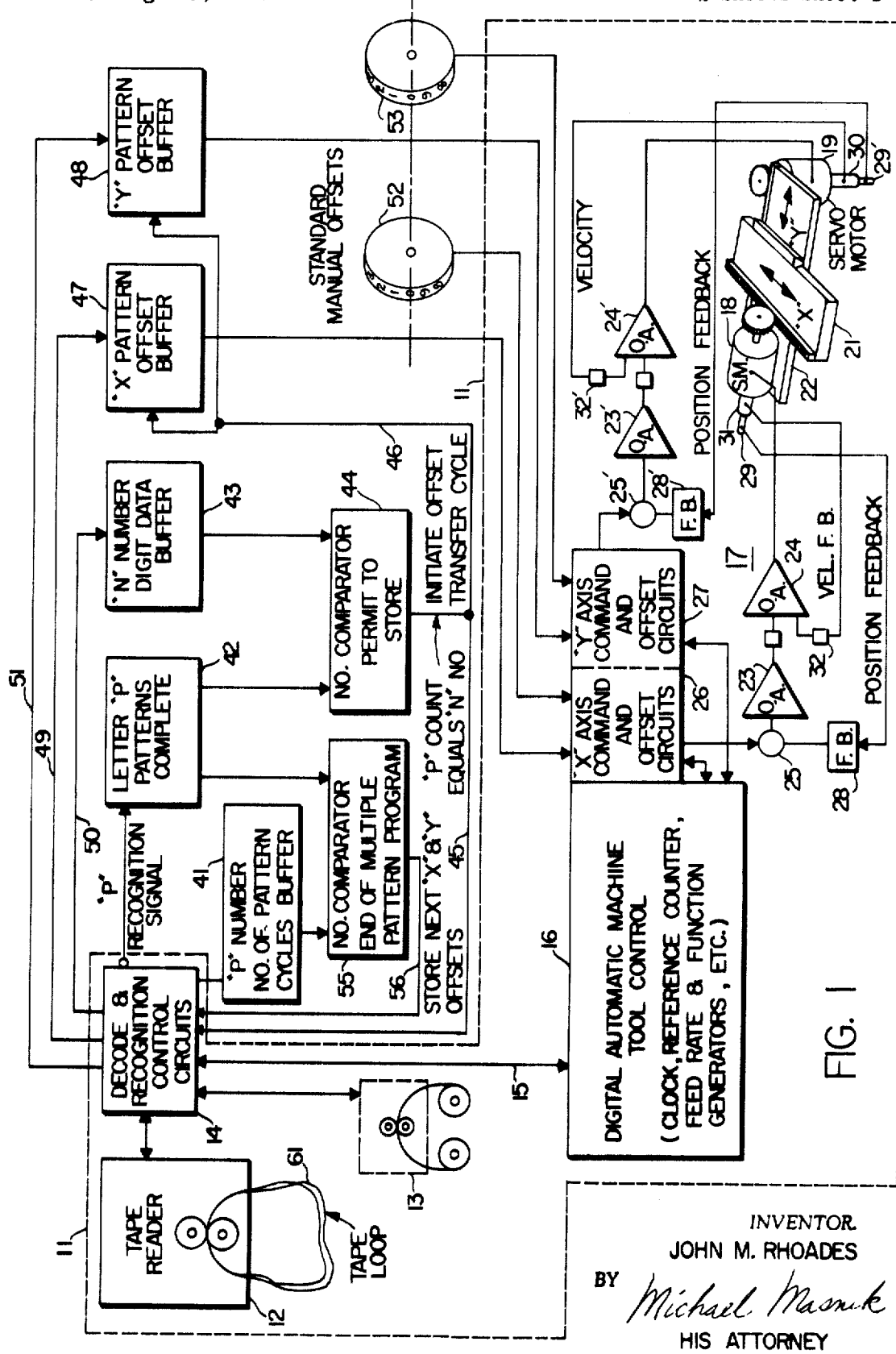
FIG. 1 is a functional block diagram of a preferred form of new and improved automatic machine tool control system constructed in accordance with the present invention, and suitable for use in carrying out the novel method of operation made possible by the invention.

FIG. 1 of the drawings is a functional black diagram of an automatic machine tool control system according to the invention. More particularly, FIG. 1 is a functional block diagram of an automatic, repeat pattern control subsystem which is to be added to and comprise a part of a known, digitally operable automatic machine tool control system. Such automatic machine tool control systems are well known in the art, and details of the construction and manner of operation of such known systems may be found by reference to patent numbers 3,248,622 and 3,327,101.

Known, commercially available automatic machine tool controls such as those identified in the above referenced articles normally include a clock pulse generator, reference counters, feed rate and function generators, etc., as well as decode and recognition control circuits and a suitable form of record reader. The record reader employed may be a magnetic tape reader, a magnetic drum reader, a punched tape reader, or even a punched card reader or some other known form of prerecorded data reader for reading out instructions prerecorded on a suitable recording medium such as punched tape, etc. For the purposes of the following disclosures, it is assumed that the automatic machine tool control being employed uses a punched tape reader, and will be so described. However, it should be expressly understood that the invention is by no means limited to use with a punched tape reader but may employ any of the known record reader devices such as those listed above. The tape reader 12 may comprise the tape reader normally included as a part of a known digital automatic machine tool control 11 used to read out punched tape instructions for controlling operation of the automatic machine tool control. This would normally be the case where the system is to be used to carry out only a series of identical machining patterns on the surface of a work member, such as that illustrated in FIG. 2 of the drawings.

In the event that the series of repeated identical patterns comprises only one part of a total set of machining instructions, and it is desired to operate the automatic machine tool control continuously without changing over taped instructions at some intermediate point in the programmed operations, then the tape reader 12 would constitute a single, additional tape reader for use in controlling operations of the digital automatic machine tool control 11 during that portion of the total machining operation wherein the repeated, offset machining patterns are to be conducted. In this eventuality, the tape reader 13 would be in addition to a main tape reader 12 shown in dotted outline form, and used in reading out the main set of punched tape instructions. At an appropriate point in the main set of taped instructions, the tape reader 12 would operate through a decode and recognition control circuit 14 to turn over control of operation of the automatic machine tool to the tape reader 13 for the purpose of carrying out the repetitive machining patterns.

An improvement permits use of a single record medium and reader. The non-repeat pattern block of data is entered into the tape along with a prefix or core indicating the approach of such a block of non-repeat data and a suffix or code indicating end of block or a return to normal. The entered data causes circuit 14 to ignore the following non-repeat blocks of data when the P number is greater than zero. Thus the tape is advanced until the entered return to normal code is detected by 14. Then the repeat pattern function is restored. Also, if desired, the non-repeat patterns can be executed after all repeat patterns are complete. In this case, the non-repeat pattern is executed after the "P" counter number equals the planned number of pattern data stored in the P number of pattern cycles to be complete buffer. For this case, the non-repeat data would be entered after the repeat pattern offset data. For purposes of the following discussion, however, it is assumed that only the repetitive pattern operations are to be conducted or executed, and hence only the single tape reader 12 is employed.

The output from the tape reader 12 is supplied to one of the inputs of a decode and recognition control circuit 14. The decode and recognition control circuit 14 normally comprises a part of an overall digital automatic machine tool control 11, and serves to convert the input signal supplied thereto from the tape reader 12 into electrical, digital, command signal pulses for use by the control system as described hereinafter. One set of output signal pulses derived by the decode and control circuit 14 is supplied directly over a conductive path 15 to the main body of the machine tool control shown in block diagram form at 16 and including the clock, reference counter, feed rate and function generators, etc., normally employed in and comprising a part of digitally operable, automatic machine tool controls. The automatic machine tool control 11 also includes positioning means shown generally at 17 which in effect are coupled to and controlled by the decode and control circuit portion 14 for moving the machine tool relative to a work member to be operated on by the machine tool in such a manner that the work member is brought into a desired spatial relationship with respect to the working head of the machine tool in accordance with the instructions being read out by the tape reader 12.

The positioning means 17 comprises a known part of automatic machine tool control 11 and includes an X-axis servo motor 18 and a Y-axis servo motor 19 which operate through suitable gear and rack arrangements for moving table members 21 and 22, respectively, in the X and Y axis directions. The table members 21 and 22 are interconnected mechanically and serve to support the work member (not shown) in a manner such that movement of the table members 21 and 22 in the X and Y directions serves to appropriately position the work member in the X and Y direction relative to the working head of the machine tool. Such mechanical positioning arrangements are very well known in the art and have been described in detail in the published literature, and hence will not be described further in detail. However, it should be expressly noted at this point that should it be desired to employ the present invention on a three-dimensional automatic machine tool control, then of course a third Z-axis servo motor and suitable interconnecting mechanical linkages need only be added to the arrangement shown in FIG. 1 to cause the table members 21 and 22 to be moved up or down in the Z-axis direction. Such modification of the arrangement shown in FIG. 1 is believed to be obvious to one skilled in the art, and hence further description thereof is deemed unnecessary.

Each of the servo amplifiers 18 and 19 are driven through suitable feedback amplifier circuit arrangements which are similar in construction and operation. For this reason, only the X-axis servo motor feedback amplifier arrangement will be described in detail since the description will apply equally well to the feedback amplifier arrangement for the Y-axis servo motor 19. The feedback amplifier arrangement used to excite the servo motor 18 is known in construction and operation, and is comprised by a pair of operational amplifiers 23 and 24 connected in series cascade arrangement with the output of the second amplifier being connected to excite the motor windings of the servo motor 18. The input of the first stage operational amplifier 23 is supplied from a summing network 25 having one input thereto supplied from an X-axis command and offset circuit 26 comprising a part of the automatic machine tool control, and a second input supplied thereto from a feedback circuit 28. The feedback circuit 28 has a position feedback signal supplied thereto from a suitable position indicator 29 connected to and rotatable with the servo motor 18. In addition to the position feedback signal, a velocity feedback signal is developed by a tachometer generator 31 and supplied back through a feedback circuit 32 to the input of the second stage, operational amplifier 24 whose output drives servo motor 18. The overall feedback amplifier arrangement is entirely known in construction and operation and serves to control the rotation of the X-axis motor 18 in accordance with the X-axis command signal supplied thereto from the X-axis command circuit 26 (to be described more fully hereinafter).

The Y-axis servo motor 19 is excited from the output of a feedback amplifier arrangement that is similar in construction and operation to X-axis amplifier, and hence the elements have been given corresponding reference numerals which are primed. The only difference in the Y-axis and X-axis arrangement is that the summing network 25' thereof is supplied from the output of a Y-axis command and offset circuit 27 comprising a part of the automatic machine tool control 11. Again, it should be noted that in the event that the invention is to be employed with a three-dimensional control, a third Z-axis command and offset circuit similar to 26 and 27 together with a suitable feedback amplifier arrangement and servo motor would be provided to acccommodate the desired three-dimensional movement.

Many of the circuit elements of the system described above are known parts of a digitally operable, automatic machine tool control. The present invention is designed for use with such a digitally operable, automatic machine tool control and may comprise an integral part of such control system, or may in fact comprise a separate subsystem to be connected to and operate with such known automatic machine tool control for use in machining operations where repetitive patterns are required. This subsystem, which shall be identified as a repeat pattern control subsystem, is comprised by a first register 41 connected to one output of the decode and control circuit 14 for storing the number of desired, repeat offset patterns to be performed on a given work member. A first counter 42 is connected to a second output of the decode and control circuit 14 for counting the number of repeat offset patterns which have been completed by the automatic machine tool, and a second register 43 similarly is connected to a third output of the decode and control circuit for storing the offset position and other characteristic data relating to each N repeat pattern to be performed by the automatic machine tool. The first counter 42 and first and second registers 41 and 43 all are of known construction and need not be described in detail. A first comparator circuit 44 of known construction has two input connections one to the output of the first counter 42 and the other to the output of the N number offset position data second register 43. By this arrangement, the first comparator circuit 44 can compare the number of patterns completed (which are recorded in the counter 42) to the position or location number N set in the register 43, and when the two numbers correspond, the comparator circuit supplies an output permit signal at its output terminal.

The output permit signal produced by the first comparator circuit 44 is supplied over a first path 45 back to an input of the decode and recognition control circuit 14 for indicating to the decode and control circuit that it should store the next set of X, Y offset position data in the data being supplied thereto from the tape reader 12. The output permit signal produced by first comparator circuit 44 is also supplied over a second conductive path 46 to the gating input terminal of an X-pattern offset data register 47 and a Y-pattern offset data register 48. The register 47 has the X-axis position offset data supplied thereto from an output of the decode and control circuit 14 over a path 49, and the register 48 has the Y-axis position offset data supplied thereto from still another output of the decode and control circuit 14 over the path 51. The output from the X-axis position offset data register 47 is supplied to one input of the X-axis command and offset circuit 26 which has a second input connected to the output of a standard, manual, offset control shown at 52. Similarly, the output of the Y-axis position offset data register 48 is supplied to one input of the Y-axis command and offset circuit 27 likewise having a second input connected to the output of a standard, manual Y-axis offset control shown at 53. As stated previously, the X-axis command and offset circuit 26 and the Y-axis command and offset circuit 27 comprise known parts of the digitally operable automatic machine tool control shown in block diagram form at 16 so that about the only modification required of these circuits is to assure that a second input terminal is provided for connection to the output of the X-axis position offset data register 47 and the Y-axis position offset data reigster 48, respectively. Since such modification is believed to be within the ability of a person skilled in the art, a further description of this portion of the system is believed unnecessary.

In addition to the above circuitry, the repeat pattern control subsystem further includes a second comparator circuit 55 having inputs connected to the output of the number of repeat offset patterns to be performed first register 41 and to the output of the number of repeat patterns completed first counter 42. The output of the first comparator 55 is connected through a path 56 back to an input of the decode and control circuit 14 to indicate to the decode and control circuit that the desired number of repeat offset patterns has been completed upon the count in first counter 42 equaling the number stored in first register 41.

With regard to the above described arrangement, it should be expressly understood that the circuit structure described is just one preferred embodiment for carrying out the present invention. Further obvious circuit arrangements, and modifications and variations of this circuit arrangement will be suggested to those skilled in the art in the light of the above teachings. Accordingly, in the following description of the operation of the above-described circuit it should be kept in mind that while description will be referenced directly to the above-described embodiment, the several repetitive operations carried out by the specific circuit structure disclosed, could be performed equally well by other similar arrangements which will be suggested to those skilled in the art.

Figure 2:
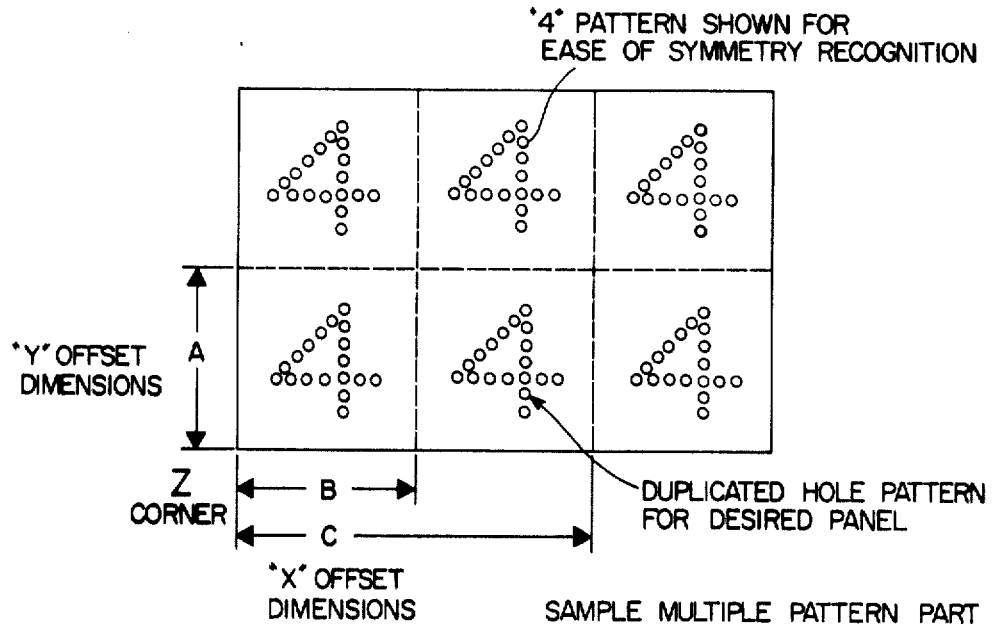
FIG. 2 is a plan view of the surface of a work member upon which a series of identical patterns (illustrated as a numeral 4) are punched in the surface of the work member, and are offset from a base or reference location of the surface of the work member in either the X-axis and/or the Y-axis direction by a predetermined set of offset dimensions.
Figure 3:
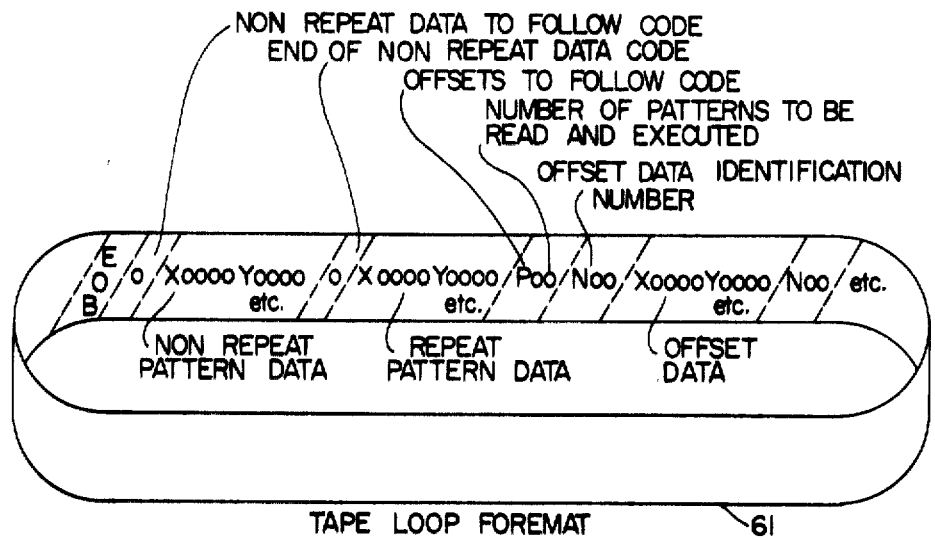
FIG. 3 is a perspective view of an endless, closed loop of punched tape showing a format for an endless loop of tape suitable for practicing the present invention.

In carrying out repetitive machining operations in accordance with the present invention, the circuit arrangement of FIG. 1 employs an endless loop of punched tape shown at 61 which is recirculated through the tape reader 12 in synchronism with the operations of the automatic machine tool. The format of an exemplary tape loop 61 is illustrated in FIG. 3 of the drawings which should be considered in conjunction with FIG. 2 of the drawings. FIG. 2 of the drawings is a plan view of an example of a typical surface of a work member on which repetitive offset machined patterns have been formed. For illustrative purposes, the patterns have been illustrated as comprising the numeral 4, and are assumed to have been formed in the surface of the work member by drilling or punching. In this example, there are six identical patterns drilled or punched in the surface of the work member with the pattern in the lower left-hand corner (referred to as the Z corner) being formed without offset and being located in what is termed as the base or reference position. The remaining patterns $N_1$ through $N_5$ then are considered to be identical but are offset in position either in the X and/or Y axis direction with respect to the reference position.

An example of a suitable tape format for performing the six repetitive machining operations required to produce the work member shown in FIG. 2, is illustrated in FIG. 3. The portion of the tape loop shown in brackets and identified by the reference number 62 has recorded thereon the data relating to the basic pattern of machining operations (i.e., formation of the numeral 4 in the example cited) to be performed at the base or reference position and to be repeated at the N offset positions. This data will include the dimensional information for each of the holes making up the pattern 4 coded in the tape in the known manner of coding X and Y dimensions along with suitable codes for the tool size, advancing the tool, retracting the tool, and other related auxiliary functions required in normal machining operations. From this information, the desired basic pattern 4 can be formed in the base or reference position on the surface of the work member.

Referring again to FIG. 3 of the drawings, the letter P constitutes a code for indicating that the offset mode of operation will follow. In addition to the code letter P, this space on the tape is also coded to establish the number of repeat patterns to be formed on the work member. In the example cited, this number will be 6. The code P section of the tape is then followed by the block number for the offset data for the second pattern to be formed on the work member. Following this block number, the additional N block identifying numbers and their associated offset position and tool data are sequentially arranged around the length of the tape loop. In the example cited, since a total of 6 patterns are to be punched in the work member, N=5 and 5 blocks of offset data will be included on the tape following the code section P.

The system shown in FIG. 1 operates in the following manner. Upon the machine tool being placed in operation, the tape loop 61 can be located within the tape reader 12 at any point within the leader section of the tape. Thereafter, the tape reader reads through the section 62 of the tape containing the data relating to the basic pattern of machining operations to be performed at the reference location on the work member, and concurrently, the work member is machined at the standard reference location in accordance with this basic pattern of machining operations in the known manner of an automatic machine tool. Thereafter, the tape reader reads through the code letter P section and will supply a setting signal to the first register 41 for registering therein the number of patterns to be formed on the work member. The P recognition signal is also supplied to the first counter 42 which in effect operates as a cycle counter in that it records one count each time that the code letter P is read out following each complete circulation of the tape loop 61 through the tape reader 12.

Following the above operation, the first block of data relating to the $N_1$ offset position will be read out by the tape reader 12 and supplied over the path 50 to the second register 43 which records each N number as it is read out by the tape reader. The first comparator circuit 44 then compares the N number to the patterns complete count in the counter 42, and upon the two numbers corresponding, supplies a P count equal the N number output code signal as a trigger to each of the X pattern and Y pattern offset position data registers 47 and 48. This output code signal also is supplied back to the decode and control circuit 14 over conductor 45 as an instruction to store the next set of X and Y offset position data in the two registers 47 and 48 for use in the next succeeding cycle of operations. During the first or $N_1$ offset pattern, however, the offset position data is read directly through the registers 47 and 48 to the respective X axis and Y axis command and offset circuits 26 and 27 due to the triggering action of the output code signal supplied over conductor 46. The supplying of this offset position data to the X axis and Y axis command and offset circuits 26 and 27 will then cause the automatic machine tool control 16, and particularly the positioning portion 17 thereof to operate the X and Y servo motors 18 and 19, respectively to move the machine table and work relative to the working head of the tool to the new offset location.

Subsequent to properly positioning the work member relative to the working head of the automatic machine tool, the tape loop 61 will continue to be scanned through the tape reader 12. As the tape reader reads through the $N_2$, $N_3$, etc., identifying number and offset position data, the numbers in the N number data register 43 will no longer correspond to the number in the number of patterns completed counter 42 so that further reading in of data to the X axis and Y axis command and offset circuits 26 and 27, is inhibited. It should be noted however, that by reason of the signal feedback over the path 45 to the decode and control circuit, the X and Y position offset data for the next succeeding pattern (in the example cited $N_2$) will be read into and stored in the registers 47 and 48 so as to be ready to be dumped into the X axis and Y axis command and offset circuits 26 and 27 upon comparator circuit 44 being again enabled.

After completely scanning through the remaining N position identifying number and offset data sections of the tape loop 61, the tape reader will again come to the beginning of the portion 62 of the tape loop containing the data relating to the basic pattern of machining operations that are to be repeated at each of the N offset locations. Since at this point in time the work member has been appropriately located by the positioning means with respect to the working head of the machine tool to position it at the $N_1$ location, the machine tool control will again read out the instructions required to perform the basic pattern of machining operations at the new location.

Upon completion of the basic pattern of machining operations at the $N_1$ offset location, the tape reader again comes to the P code section at which point a new count will be read into the letter P patterns complete counter 42 to reset this counter. Thereafter, as the tape reader reads through the $N_1$ position offset data the control will be inhibited due to the mismatch of the numbers in the counter 42 and the register 43. However, upon reaching the $N_2$ position offset data the count in the counter 42 will match the count in the register 43 and comparator circuit 44 will be activated to thereby read in the $N_2$ position data to the X-axis and Y-axis command and offset circuits 26 and 27 from registers 47 and 48 in the previously described manner. Concurrently, the $N_3$ position data will be read into and stored in the registers 47 and 48. In this fashion, through repeated cyclical readings of the tape loop 61, the basic pattern of operations will be performed at each of the N offset locations.

The X and Y position offset data for each of the desired repeat pattern offset locations will be read into the X and Y position offset data registers 47 and 48 and thereafter supplied to command and offset circuits 26 and 27, cyclically in the above-described manner until the P patterns complete counter 42 reaches the number stored in the P number of pattern cycles desired register 41. Upon this occasion, the end of multiple pattern complete comparator 55 detects that the desired numbers of patterns have been completed, and provides an output signal over the path 56 to the decode and control circuit 14 to indicate that the desired number of repeated patterns has been completed. This signal can then be used in the decode and control circuit 14 to reset the X-Y offset position of the work member to zero value, to reset the offset position of the work member to a load-unload position, to turn control of the automatic machine tool back over to the main tape reader 13 in the event such is being used, or any other similar function desired to be performed at the completion of the desired number of patterns.

From the foregoing description, it will be appreciated that the invention provides a repeat pattern control system and subsystem and method of operation which will repeat a pattern of machining operations at a multiplicity of desired different offset locations on a work member. This is achieved by prerecording the desired pattern dimensional and machine instructions on a single endless record member (such as a loop of punched tape) which is repetitively read out by a single record reader (such as a punched reader). In addition to the basic pattern instructions, the pattern position offset data for each of the N offset positions along with suitable keys identifying the instructions for each Nth offset position and the beginning and end of the pattern instruction are recorded. Using this tape in a single tape reader, provision is made for sequentially moving the machine tool to each new desired offset position location and thereafter repeating the basic pattern of operation for the desired number of positions where it is desired that the pattern be formed.

While one specific embodiment of a suitable apparatus for performing the invention has been described, it is believed obvious that other modifications and variations are possible. For example, a semi-automatic mode of operation can be provided wherein an operator manually introduces the Y dimension position offset information needed by the machine. Further, while the possibility of adding a Z-axis dimension has been mentioned, it is also possible to provide for offset positioning in either only the X-axis or Y-axis direction. Other similar modifications of the basic system will be suggested to those skilled in the art in the light of the above teachings. It is therefore to be understood that changes may be made in the particular embodiment of the invention described which are within the full intended scope of the invention as defined by the appended claims.

What is calimed and desired to be secured by United States Letters Patent is:

1. Apparatus for operating on an object with an automatic machine under control of command data serially recorded on a recording tape wherein said command data includes data representing a plurality of offset positions, a single repeat pattern of control to be executed at each of said offset positions and the total number of patterns to be repeatedly executed, and said tape has associated therewith a tape reader adapted to serially read the data recorded on said tape comprising, means including said reader for repeatedly reading from said tape the data representing said repeat pattern of control, means including said reader for reading from said tape the data representing the total number of repeat patterns to be executed and for storing it to provide a total number, means for counting each time the repeat pattern is read to provide a repeat pattern count number, means for comparing said count number with said total number of patterns to provide an output signal, means responsive to said output signal for reading from said tape the data representing the offset position corresponding to the count number when said count and total number of patterns do not agree, and for executing said repeat pattern at said offset position.

2. An arrangement according to claim 1 further comprising means responsive to said output signal indicating agreement between said count number and total number to terminate control action.

3. An arrangement according to claim 1 wherein said command data includes data representing a non-repeat pattern of control to be executed at the initial offset position and a non-repeat pattern identification code, means including said reader for reading said non-repeat pattern identification code, and means including said reader responsive to said count number equalling zero for reading from said tape said non-repeat pattern and means for executing said read non-repeat pattern at said initial offset position.

4. An arrangement according to claim 3 further comprising means responsive to said count number not equalling zero for disabling said means for executing said non-repeat pattern and enabling said means for executing said repeat pattern.

5. Apparatus for operating on an object with an automatic machine under control of command data recorded on a common record medium wherein said command data includes data representing a plurality of offset positions, a repeat pattern of control to be executed at each of said offset positions and the total number of repetitions of a repeat pattern to be executed, means for repeatedly reading from said medium data representing said repeat pattern of control, means for reading from said medium the data representing the total number of repeat patterns to be executed to provide a total number, means for counting each time the repeat pattern is read to provide a repeat pattern count number, and means responsive to disagreement between said count number and said total number for reading from said medium the data representing the offset position corresponding to the count number and for executing said repeat pattern at said offset position.

6. An arrangement according to claim 5 wherein said command data includes data representing a non-repeat pattern of control to be executed at a given offset position comprising, means repsonsive to said count number equalling a given count for reading from said medium, data representing said non-repeat pattern and means executing said non-repeat pattern at said given offset position.

7. An arrangement according to claim 5 further comprising means responsive to said count number not equalling said given count for disabling said means for executing said non-repeat pattern and enabling the reading and execution of said repeat pattern.

8. Apparatus for operating on an object with an automatic machine under control of command data recorded on a common record medium wherein said command data includes data representing a plurality of offset positions, and a repeat pattern of control to be repeatedly executed N times, at least once at each of said offset positions, means for repeatedly reading from said medium data representing said repeat pattern of control and said offset positions, means for counting each time the repeat pattern is read to provide a repeat pattern count number, and means responsive to said count number equalling a count other than N for executing said repeat pattern at the offset position corresponding to said count number.

9. An arrangement according to claim 8 wherein said command data includes data representing a non-repeat pattern of control to be executed at a given offset position, means responsive to said count number equalling a given count for reading from said medium data representing said non-repeat pattern, and means for executing said read non-repeat pattern at said given offset position.

10. An arrangement according to claim 9 further comprising means responsive to said count number for sequentially executing said non-repeat and repeat pattern at desired offset positions.

11. An arrangement according to claim 9 further comprising means responsive to said count number equalling a count other than said given count for disabling the execution of said non-repeat pattern and enabling the execution of said repeat pattern.

12. Apparatus for controlling a machine moving member for operating on an object wherein said apparatus comprises means for reading a set of preformed instructions recorded on a recording medium, decode and control circuit means coupled to and controlled by said reading means for converting the instructions being read out to electrical signals representative of the instructions and thereafter controlling the machine moving member in accordance with the instructions, and positioning means operatively coupled to and controlled by the decode and control circuit means for moving the machine moving member relative to said object to be operated on into desired spatial relationships in accordance with the preformed instructions; the improvement comprising a repeat pattern control subsystem including first logic circuit means for sequentially selecting from the output of the decode and control circuit means each of the offset data relating desired axis positions and desired characteristics of each one of N repeat patterns, command circuit means controlled by said first logic circuit means for sequentially reading into said positioning means the said desired axis offset data for each of the N repeat patterns, said positioning means being operative after the reading in of the offset data relating to each Nth pattern to appropriately locate the moving member with respect to said object, means coupled to the output of the decode and control circuit means for sequentially reading into and controlling the machine tool in accordance with the repeat pattern after each such setting, and second logic circuit means coupled to the output of the decode and control circuit means for identifying the completion of the desired number of repeat patterns and thereafter inactivating the system from further repetitions of the repeat patterns.

13. An automatic machine tool control system according to claim 12 wherein the repeat pattern control subsystem further includes a single additional and separate record reader for reading out the repeat pattern and the sets of offset data relating thereto and said recording medium comprises an endless recording member for rotation through the separate record reader in synchronism with the operations of the machine tool.

14. An automatic machine tool control system according to claim 13 wherein the single additional record reader is a punched tape reader and the endless recording member is a closed loop of punched tape.

15. An automatic machine tool control system according to claim 14 wherein the system is designed to provide three dimensional control over movement of the machine in the X, Y, and Z axes and wherein the first logic circuit means selects out the X-axis, Y-axis and Z-axis offset data for each of the N repeat patterns, and said command circuit means sequentially reads into the positioning means the X-axis, the Y-axis and the X-axis offset data for each of the N repeat patterns.

16. In an automatic machine tool control system having means for reading a set of preformed instructions recorded on a suitable recording medium, decode and control circuit means coupled to and controlled by said reading means for converting the instructions being read out to electrical signals representative of the instructions, and positioning means operatively coupled to and controlled by the decode and control circuit means for moving the machine tool relative to a workpiece to be operated on by the machine tool in accordance with the preformed instructions; the improvement comprising a repeat pattern control subsystem including a first register for storing the number of repeat offset patterns to be performed, a first counter for the number of repeat patterns completed and a second register for storing the offset and other characteristic data for each of said repeat patterns, said first register, said first counter and said second register all being connected to outputs from the decode and control circuit means, a first comparator circuit means connected in common to the outputs from the first counter and the second register, X-axis command and offset circuit means connected to and controlling offset movements of the positioning means in the X-axis direction, Y-axis command and offset circuit means connected to and controlling the offset movements of the positioning means in the Y-axis direction, an X-axis offset pattern data register connected to and controlling the X-axis command and offset circuit means, and a Y-axis offset pattern data register connected to and controlling the Y-axis command and offset circuit means, the inputs to said X-axis offset pattern data register and Y-axis offset pattern data register being connected to respective X-axis and Y-axis offset pattern data outputs from said decode and control circuit means, the output from said first comparator circuit means being connected to control the supply of X-axis offset pattern data and Y-axis offset pattern data from the respective outputs of the decode and control circuit means to the inputs of the X-axis and Y-axis offset pattern data registers, the output from said first comparator being further connected to control transfer of data from the X-axis and Y-axis offset pattern data registers to the X-axis and Y-axis command and offset circuit means, respectively, and second comparator circuit means connected in common to the outputs from the first counter and the first register, the output of the second comparator circuit being connected back to control further operations of the decode and control circuit means.

17. An automatic machine tool control system according to claim 16 wherein the repeat pattern control subsystem further includes a single additional and separate punched tape type record reader for reading out the repeat pattern and the N sets of offset data relating thereto and the suitable recording medium comprises an endless loop of punched tape for rotation through the separate punched tape record reader in synchronism with the operations of the machine tool, the loop of punched tape having stored thereon data relating to a pattern of machine operations to be repeated at a number of different locations on the work member which are offset relative to a reference location, data relating to the number of offset locations on the work member, data relating to the identity and offset dimensions together with other pertinent tool adjustment data for each Nth offset location, and an end of instructions code.

18. An automatic machine tool control system according to claim 16 wherein the system is designed to provide three dimensional control over movement of the machine in the X, Y and X axes and wherein the first comparator circuit means selects out the X-axis, Y-axis and Z-axis offset data for each of the N repeat patterns, and said command and offset circuit means sequentially reads into the positioning means the X-axis, the Y-axis and the Z-axis offset data for each of the N repeat patterns.

19. A method of operating on an object with an automatic machine having a control requiring only a single record reader and employing a common, repetitively readable recording medium having recorded thereon the data relating to a repeat pattern of machine operations to be repeated a number of times at different locations on a work member and further including the data relating to the offset dimensions of the several positions on the work member where the pattern of operations is to be repeated together with suitable codes identifying each particular set of offset dimensions and the start and the end of the repeat pattern data, the method comprising operating on the work member at a first reference location in accordance with the repeat pattern of operations in response to the repeat pattern data read out by the single record reader, reading out and positioning the machine relative to said object at the location of the first offset position where the pattern of operations is to be repeated, inhibiting the machine from responding to further offset positions data recorded on the record medium while scanning the record through the record reader to the start of the repetitive pattern data, reading out and controlling the machine to operate on the object at the first offset location in accordance with the repeat pattern of operations data, inhibiting the machine from responding to previously executed offset positions data recorded on the record medium while scanning the recorded data through the record reader to the start of the next unexecuted offset position data, and thereafter repeating the preceding cycle of operations for the desired number of repeated machining operations to be conducted on the object.

20. A method according to claim 19 wherein said recording medium has recorded thereon data relating to a non-repeat pattern of machine operations comprising detecting the existence of said recorded non-repeat data, reading out and controlling the machine to operate on the object at a desired location in accordance with the said non-repeat pattern of operations and controlling the machine to respond only once to said non-repeat data.

21. A pattern control subsystem for operating on an object with an automatic machine under control of control data stored on a single record medium wherein said control data includes data representing a plurality of offset positions and a single repeat pattern, means for sequentially selecting out from said data said repeat pattern and said offset data relating to each one of N repetitions of said repeat pattern, means for positioning said machine, command circuit means controlled by said first mentioned means for sequentially applying to said positioning means desired axis offset data for each of the N repetitions, the said positioning means responsive to the application of said offset data relating to each of the N repetitions to appropriately locate the object relative to the machine and means for controlling the machine in accordance with said repeat pattern after each response to the application of said offset data.

22. An arrangement according to claim 21 further comprising a means for detecting the existence of non-repetitive data, means for controlling the machine to operate on said object at a desired location in accordance with said non-repetitive data and means for inhibiting thereafter control of said machine by said non-repetitive data while controlling said machine in accordance with said repeat pattern.

23. A pattern control subsystem, according to claim 22 wherein said selecting means comprises a record reader for scanning the record medium in synchronism with the operations of the machine tool.

24. A pattern control subsystem according to claim 23 wherein said record reader is a punched tape reader and said record medium is a closed loop of punched tape.

25. A pattern control subsystem according to claim 21 wherein the subsystem is designed to provide three dimensional control over movement of the machine in the X, Y and Z axes and wherein the first mentioned means selects out the X-axis, Y-axis and Z-axis offset data for each of the N repeat patterns, and said command circuit means sequentially reads into the positioning means the X-axis, the Y-axis and the Z-axis offset data for each of the N repeat patterns.

References Cited

UNITED STATES PATENTS

| 3,356,994 | 12/1967 | Elbling | 340—172.5 |
| 3,375,354 | 3/1968 | McGarrell | 235—151.11 |
| 3,391,392 | 7/1968 | Doyle | 340—172.5 |

PAUL J. HENON, Primary Examiner

P. R. WOODS, Assistant Examiner

U.S. Cl. X.R.

235—151.11

UNITED STATES PATENT OFFICE
CERTIFICATE OF CORRECTION

Patent No. 3,559,179                     Dated January 26, 1971

Inventor(s)  John M. Rhoades

It is certified that error appears in the above-identified patent and that said Letters Patent are hereby corrected as shown below:

Column 2, line 43, "form" should read -- for --; line 51, "charcateristics" should read -- characteristics --. Column 3, line 59, "black" should read -- block --. Column 4, line 6, "disclosures" should read -- disclosure --; line 42, "core" should read -- code --. Column 6, line 72, "reigster" should read -- register --. Column 7, line 55, "number" should read -- numeral --. Column 11, line 5, after "means" insert -- for --; lines 11 and 12, after "enabling" and before "said repeat pattern.", cancel "the reading and execution of" and insert instead therefor -- said means for executing --.

Signed and sealed this 17th day of August 1971.

(SEAL)
Attest:

EDWARD M. FLETCHER, JR.                WILLIAM E. SCHUYLER, JR.
Attesting Officer                      Commissioner of Patents